(12) United States Patent
Smith et al.

(10) Patent No.: US 6,442,296 B1
(45) Date of Patent: Aug. 27, 2002

(54) ARCHIVAL INFORMATION STORAGE ON OPTICAL MEDIUM IN HUMAN AND MACHINE READABLE FORMAT

(75) Inventors: Archibald W. Smith, Boulder; Michael L. Leonhardt, Longmont; James Martin Frary, Louisville, all of CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/187,440

(22) Filed: Nov. 6, 1998

(51) Int. Cl.[7] .................................................. H04N 1/00
(52) U.S. Cl. ...................................... 382/237; 348/112
(58) Field of Search .......................... 382/237; 395/1.9; 348/96–112

(56) References Cited

U.S. PATENT DOCUMENTS

| | | | |
|---|---|---|---|
| 4,090,031 A | 5/1978 | Russell ........................ 358/130 |
| 4,346,449 A | 8/1982 | Ovshinsky et al. ......... 364/900 |
| 4,511,930 A | 4/1985 | Lemelson .................... 358/335 |
| 4,818,852 A | 4/1989 | Haddock et al. ............ 235/488 |
| 4,839,747 A | 6/1989 | Fujiwara ...................... 348/352 |
| 4,884,260 A | 11/1989 | Bouldin et al. ............... 369/93 |
| 4,973,150 A | 11/1990 | Bryant ......................... 358/222 |
| 5,052,042 A | 9/1991 | Morton et al. |
| 5,105,284 A | 4/1992 | Sakata et al. ................ 358/404 |
| 5,195,081 A | 3/1993 | Usui ............................ 369/112 |
| 5,218,673 A | 6/1993 | Fujiwara ...................... 396/164 |
| 5,321,683 A | 6/1994 | Olczak ......................... 369/112 |
| 5,335,082 A | 8/1994 | Sable ........................... 358/350 |
| 5,491,511 A | 2/1996 | Odle ............................ 348/153 |
| 5,504,732 A | 4/1996 | Gregg et al. ................. 369/116 |
| 5,506,697 A | 4/1996 | Li et al. ....................... 358/448 |
| 5,706,457 A | 1/1998 | Dwyer et al. ................ 359/349 |
| 5,721,687 A | 2/1998 | Lamartine et al. ..... 364/474.08 |
| 5,832,170 A | 11/1998 | Keery et al. ................. 359/349 |
| 5,841,885 A | 11/1998 | Neff et al. ................... 382/112 |
| 5,999,697 A | 12/1999 | Murase et al. .............. 386/101 |

OTHER PUBLICATIONS

New Kodak System for Long–term Archiving Assures Access to Digital Documents; Kodak Press Release; Apr. 1, 1996; and Kodak Document Archive Writer, Model 4800; Kodak Product Description.

H–D Rosette Archival Preservation Systems; Norsam Product Description.

Podio, Fernando L.; "Digital Optical Tape: Technology and Standardization Issues"; National Instituten of Standards and Technology, Gaithersbeurg, Maryland.

Kodak Digital Document Archive System 1996 A–5414 CAT 897–9833; www.kodak.com/US/en/business/products/dabro.shtml.

(List continued on next page.)

Primary Examiner—Thomas D. Lee
Assistant Examiner—Stephen Brinich
(74) Attorney, Agent, or Firm—Brooks & Kushman P.C.

(57) ABSTRACT

A system and method for storing documents in human and machine readable format. A laser scanner is used to write de-magnified visual copies and digital records of the documents in an optical recording medium. A table of contents and record headers are provided to ease document retrieval. The optical recording medium is made of materials which can be written directly by the laser scanner without the need for post-writing processing. The direct write characteristic allows immediate retrieval, and allows additional documents to be added to the optical recording medium at later times. The documents are retrieved from the optical recording medium by either magnifying the visual copies or by regenerating the documents in visual form using the digital information.

38 Claims, 4 Drawing Sheets

OTHER PUBLICATIONS

A–5415 CAT 117–7640; Kodak Document Archive Writer Model 4800 www.kodak.com/bisHome/productinfor/catalog/techinfor/a5415 Archive Writer.pdf.

Will charged–particle systems redefine high density storage; A. Bartlett, H. Fatemi, and M. Eberle, Data Storage Magazine Nov./Dec. 1997.

HD–Rosetta™ Archival Storage System http://www.nor-sam.com/rosetta.htm.

ARCHIVAL INFORMATION STORAGE ON OPTICAL MEDIUM IN HUMAN AND MACHINE READABLE FORMAT

TECHNICAL FIELD

The present invention relates to long term information storage and retrieval in both human and machine readable format on optical media.

BACKGROUND ART

A traditional method of archiving human readable information is to record documents on microfilm. These documents may originally be in the form of paper, photographic film and the like, as well as electronic data generated by computer. The microfilm recording process involves exposing photosensitive film to demagnified images of the documents. After the film has been exposed, it is subjected to wet chemical processing to develop the images. The recorded documents are usually read by projecting their magnified images on to a screen, or by enlarging them with a television camera and a video monitor. With typical de-magnifications of up to 25×, the storage density of microfilm is on the order of 50 Mbits/inch$^2$. When properly stored, the microfilm is estimated to have a life of up to 500 years.

A limitation of microfilm is that the film must be chemically processed prior to the retrieval of the stored information. As such, documents are usually recorded onto microfilm in groups. Once a piece of microfilm has been developed no further documents can be recorded on that particular film. The chemical development process itself leaves waste silver and other chemicals which need to be disposed. Another limitation is that microfilm has little gray scale capability and no color capability, thus its use is limited to high contrast, black and white text documents and drawings. Finally, few systems are available to mechanically interface the microfilm to automated libraries, or the recorded information to computer systems.

With the advancement of computer storage technology, information is increasingly stored in digital form. Documents not already in digital form are converted into Tagged Image File Format (TIFF) or similar electronic file formats using a document scanner, and stored on magnetic tape, optical disks, or the like. For retrieval or viewing, the documents are reconstructed from the electronic files and displayed on monitors or printed onto paper. Storage densities for the magnetic tapes and optical disks typically exceed 100 Mbits/inch$^2$. The magnetic tapes can be compatible with conventional tape library systems when mounted in standardized cartridges that allow for automated handling. Likewise, optical disk handling can be automated. Data on the magnetic tapes have a stored lifetime of 10 to 20 years. Optical disk data lifetimes are estimated to be around 30 to 60 years. Both magnetic tape and optical disks, however, are vulnerable to the rapid advancements in computer storage technologies that make their readers obsolete. In order to have the information in readable form 100 years from now the information on existing magnetic tape and optical disks will have to be migrated periodically to new media to maintain compatibility with the changing read/write equipment.

The Kodak Archive Writer has improved on the storage capacity over microfilm by using rolls of 16 millimeter film and increasing the de-magnification to 40×. Each document is input as a TIFF electronic file which is used to modulate the intensity of a spot formed on a cathode ray tube (CRT). The CRT spot is optically imaged on to the film, which is exposed with a visual image of the document by appropriately scanning the CRT spot. As with the microfilm, prior to document retrieval the entire roll is subjected to wet chemical processing to develop the images. Retrieval of the information is accomplished with a television camera and computer which recreates the TIFF files from the visual images.

Another approach for long term storage is the Rosetta System proposed by Norsam Technologies. In the Rosetta System visual information is written into a silicon wafer using electron beam exposure or ion implantation. This requires the use of an energetic scanning electron beam or ion beam in a vacuum chamber. The silicon is then depth-etched using an etch-stop technique to form a master disk. This wet chemical processing results in similar batch limitations as microfilm. Documents are stored at 850× de-magnification at a density of over 2 Gbits/inch$^2$. Reading of the visual images is accomplished with a high-powered microscope equipped with phase contrast or interference-optics.

Consequently, a need has developed for a document storage approach which will allow the documents to be retrieved decades into the future without the need for readers which have long since become obsolete. The approach must accommodate documents of various sizes, resolutions, those containing shades of gray and color, and it must allow for new documents to be added to or retrieved from the storage media at any time. For ease of integration with existing computer systems the document storage approach should be compatible with current automated removable-media library systems and allow for storage in digital formats.

DISCLOSURE OF INVENTION

The object of the present invention is to provide a system and a method for storing documents for long periods of time. In particular, the invention starts with the documents in an electronic file format and ends with the documents stored in de-magnified human readable format on an optical recording medium so that the documents can be retrieved using a microscope. A Table of Contents and file headers containing indices and other metadata regarding each document may be included to help identify, locate and manage the documents during read-out. The optical recording medium is direct laser writeable to allow additional documents to be added and retrieved at any time.

A further object of the invention is that the information contained in the electronic files is processed prior to writing to accommodate shades of gray, color, and different resolutions of the documents.

Yet another object is that the documents can be stored in both digitally encoded and human readable form on the same physical media.

In carrying out these objects, the above objects, and other objects, features and advantages of the present invention will be readily apparent upon consideration of the following detailed description of the best mode for carrying out the invention in conjunction with the accompanying drawings.

BEST MODE FOR CARRYING OUT THE INVENTION

Figure 1:
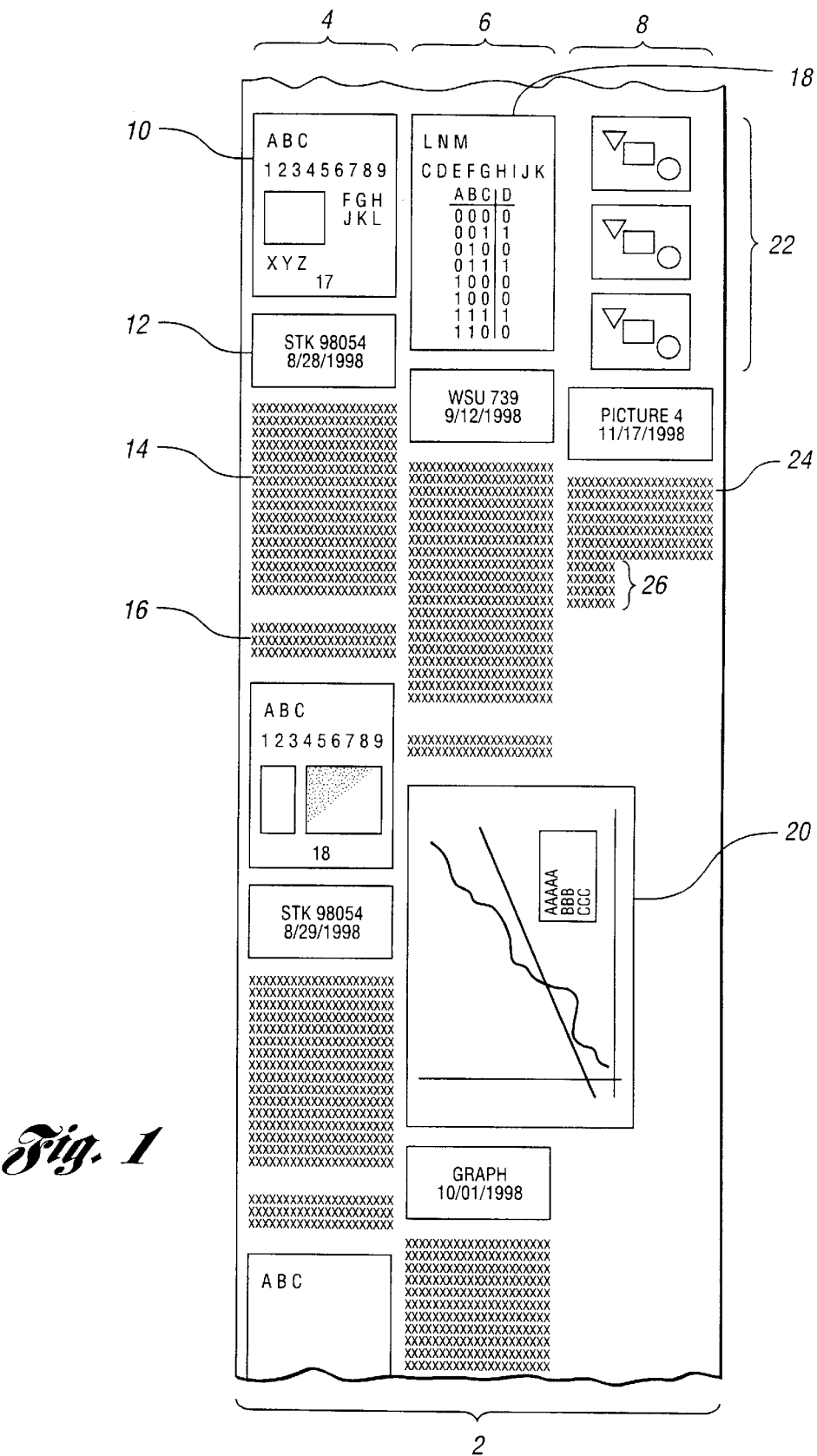
FIG. 1 is an illustration of data written on an optical recording tape with the visual records and digital records in the same track.

The present invention stores documents on laser writeable optical media which does not require post-writing processes. Use of the laser writeable media allows documents to be added to the media at different times thus eliminating the need for batch processing of all of the documents at the same time. The information is stored in human readable format (visual record) to make recovery of the documents dependent only on the availability of an optical microscope, scanning electron microscope, acoustic microscope, or any other method of imaging and magnifying the documents stored on the media. The information can also be stored in digitally encoded form (digital record) to provide direct digital read-out when an appropriate reader is available. Where the digital form of the document was not recorded, or is otherwise unreadable, the visual form of the document can be read by optical or non-optical method and digitized to recreate the electronic file.

The present invention starts by reading the documents once they exist as electronic files. Hard copy documents may be converted into the electronic files using conventional document scanners, or the documents may be created as electronic files using any program that produces an output that is intelligible to human viewing, including existing word processing, graphic, or painting software programs. A typical document is a letter on standard 8.5 by 11 inch size paper. A typical electronic file is a 300 dots per inch (dpi) Tagged Image File Format (TIFF) version of a document. The invention allows for the documents to contain text, graphics, images, pictures, still frames of videos, shades of gray, color, and dual images of a scene for 3-dimensional stereoscopic viewing. The electronic files can hold the information in formats other than TIFF and at resolutions other than 300 dpi.

The documents are recorded on an optical recording medium which can accommodate both visual images and digital information. The optical recording medium includes a writeable layer on a supporting substrate. For media in the form of an optical tape the substrate may be polyester, kapton, aramid, or metals. For media in the form of an optical disk the substrate may be a rigid plastic such as polycarbonate, or a flexible plastics such as polyester. The writeable layer permits direct writing with a laser. Clearly, other forms and geometries which enable the objectives of high volume efficiency, fast access capability and compatibility with media automation schemes, such as; spheres, cylinders, cubes, thin, planar rectangular shapes or collections of these within a housing would be suitable for implementing this invention. Direct writing eliminates the need for post-writing development which in turn allows for additional documents to be written and retrieved at any time. Preferably the writeable layer changes reflectivity when written in order to simplify the viewing of the visual records. Preferably the writeable layer does not produce debris during the writing process. Finally, the writeable layer must have a long data retention life. Several laser writeable materials are available including metallic films, dye-polymer films, magneto-optical films, and amorphous to crystalline phase transition films. In the preferred embodiment the optical recording medium is an amorphous to crystalline phase transition film on a polyester substrate. Amorphous to crystalline phase transition films produce high resolution, high read contrast data at moderate write power densities, create no debris during the write process, and have an expected data lifetime of greater than 100 years under controlled storage conditions.

To make the optical recording medium compatible with existing automated removable-media library systems it is in the form of a disk, or a tape housed in a standard form factor cartridge. In the preferred embodiment the medium is a 12.65 millimeter (½ inch) wide 200 meter (655 feet) long optical tape housed in an IBM 3480 compatible form factor cartridge. One such cartridge and tape can store approximately 220,000 8.5 by 11 inch documents in visual form only and de-magnified approximately 85×, and approximately 80,000 such documents in both visual and digital form, complete with headers and a Table of Contents.

FIG. 1 shows an example of data stored on an optical recording tape 2. The surface area of the optical recording tape 2 is divided into a first track 4, a second track 6, and a third track 8 which run parallel to the length of the tape. A visual record 10 of a standard 8.5 by 11 inch document is stored in the first track 4 with the width of the visual record 10 being slightly narrower than the width of the first track 4. Below the visual record 10 is a visual header 12. The digital record 14 and digital header 16 for the document follow the visual header 12. In the second track 6 the visual record 18 of an 8.5 by 14 inch document is stored. Further down the second track 6 is the visual record 20 of a large graph. This visual record 20 exceeds the width of the second track 6 and thus crosses into the third track 8. In the third track 8, three visual records 22 are used to record a color document. Each one of the three visual records 22 contain one color separation component of the document. Other numbers of color separations can be used. The digital record 24 of the color document is shown in the process of being written by an array of four laser beams 26. In a preferred embodiment the writeable layer is divided into a table of contents area and five parallel tracks. Each track is 2.50 millimeters wide to accept 8.5 inch wide documents at 300 dpi using a dot size of just under 1 micrometer. The resulting visual records are miniature reproductions of the original documents de-magnified by a factor of approximately 85×. The size of the features shown in FIG. 1 are exaggerated.

The data stored on the optical recording medium is binary in nature. Where the laser beams strike the writeable layer there is a change in the material's appearance, be it a crystalline phase change, pit formation, ablation, hole burning, or the like. Where the laser beams do not strike the writeable layer the material retains its original reflectivity. This binary nature allows the recording of black and white visual images and digital data. To accommodate documents with shades of gray the present invention converts the various levels of gray into halftone patterns before recording. To accommodate documents with color the present invention first separates the document into multiple color components (for example red, green and blue), then converts each color component into halftone images, and finally records the multiple halftone images as in 22.

The present invention accommodates documents of different resolutions and dimensions. The product of the electronic file's resolution and the document's physical dimensions is the maximum number of pixels (picture elements) of information potentially contained within that document. In practice, blank areas in the document which have no informational content could be compressed to speed operations during information processing and writing. If the electronic file defines more or fewer pixels across the width of a document than the number of laser spots which can be recorded across the width of one track, the electronic file can be processed to reduce or increase the number of pixels. This may be accomplished by scaling the document's dimensions while keeping the resolution (pixels per inch) constant, scaling the document's resolution while keeping the dimensions constant, or scaling both the dimensions and resolution.

Alternatively, the dimensions of the visual record can be scaled up or down so that there is a 1:N match between the pixels in the electronic file and the laser spots in the visual record, where N is an integer. Wide visual records are recorded across two or more adjacent tracks as in 20. If the number of pixels in the length direction in the document's information in the electronic file exceed a predetermined limit or predefined algorithmic rules set by the recorder format, the document may be either divided into multiple documents or recorded along a greater length of the track as in 18. All of the above recording options can be controlled by predetermined rules, the user, or software applications.

A visual header may be recorded in the optical recording medium for each document. These headers contain alphanumeric identifiers and metadata regarding the origin, contents, and recorded image characteristics of the documents. They are positioned near the visual records. In the preferred embodiment each header is positioned adjacent to it's associated visual record.

The digital records permit direct recreation of the documents in an electronic format without loss of quality when a compatible reader is available. The digital information is optically encoded using standard techniques such as pulse width modulation, pulse position modulation, or the like. Each digital row of data is separated from the adjacent rows in order to avoid cross-talk. Error correction coding may be included to assist in retrieving the data from the optical recording medium. Servo marks may also be included to assist in tracking the digital rows during read-out. In the preferred embodiment the digital information is written using the same array of laser beams as the visual record, with appropriate modification of the tape velocity and laser unit operations to give a row separation of about one laser spot width.

Figure 2:
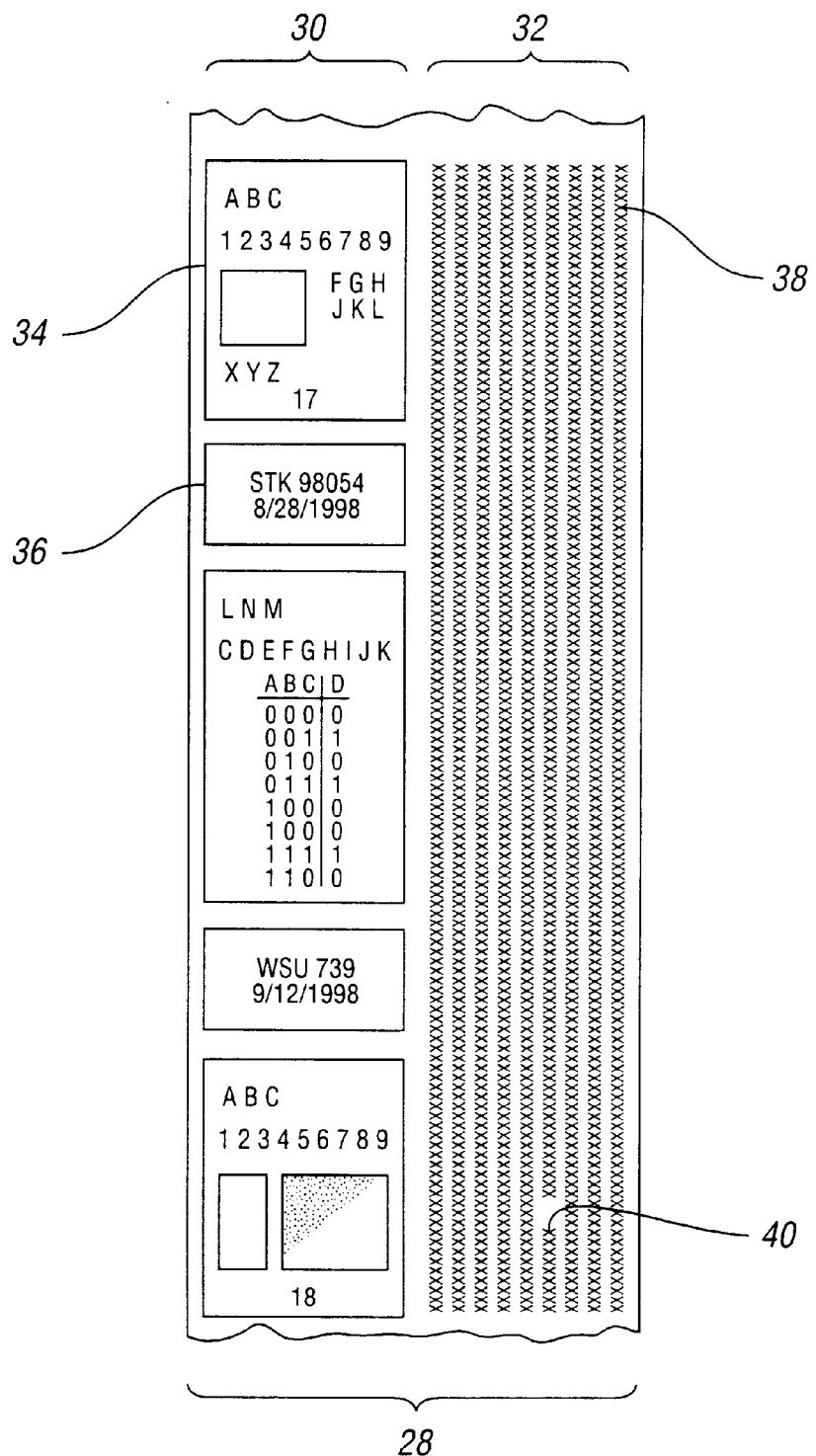
FIG. 2 is an illustration of data written on an optical recording tape using traverse scanning for writing the visual records and longitudinal serpentine scanning for writing the digital records.
Figure 3:
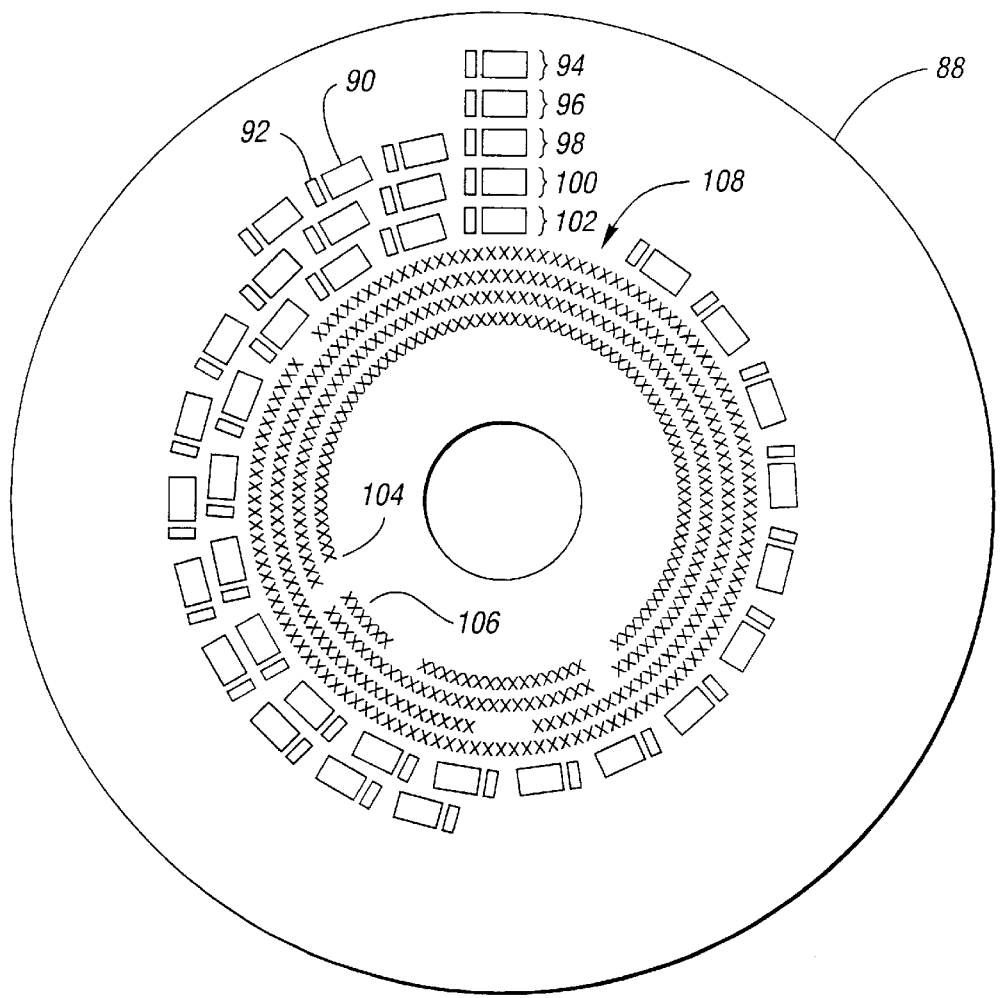
FIG. 3 is an illustration of data written on an optical recording disk.

As with the visual information, the digital information includes a digital record and an optional digital header for each of the documents. Each digital record contains a copy of the digital information from the document's electronic file. In the preferred embodiment the digital records are written on transverse rows across the width of one track with each row being slightly narrower than the width of the track. The physical length of the digital record varies with the amount of information to be recorded. In practice the physical length of the digital record on the optical media range from 1.5 to twice that of the visual records. In an alternative embodiment the digital records are written on longitudinal rows which run the length of the track. FIG. 2 shows the digital information written along longitudinal rows. An optical recording medium 28 is divided into a first track 30, and a second track 32. The visual record 34 and visual header 36 of a document are recorded in the first track 30. The digital record 38 and digital header 40 of the same document are recorded in the second track 32 using a serpentine type trace. In this embodiment the laser scanner uses an array of lasers to quickly write the digital record 38 and digital header 40. FIG. 3 shows another alternative embodiment where the medium is an optical disk 88. The visual records 90 and visual headers 92 are recorded in concentric tracks 94, 96, 98, 100 and 102. The to digital records 104 and digital headers 106 are recorded in a spiral track 108 inside track 102. With curved tracks, the documents may be written with straight edges as shown in the figure or, if a slight distortion is acceptable, they may be curved to follow the tracks. The size of the features in FIG. 2 and FIG. 3 are exaggerated.

As shown in FIG. 1 and FIG. 2 digital headers may be included for each digital record. Like their visual counterparts, the digital headers contain alphanumeric identifiers and metadata regarding the origin and contents of the documents. They are usually positioned near the digital records. In the preferred embodiment each digital header is positioned adjacent to it's associated digital record.

To aid in the retrieval of information from the optical recording medium the invention includes defining a table of contents area on the writeable layer. Within the table of contents multiple entry positions are reserved for a predetermined number of documents. The entries are written in visual form and optionally in digital form. Each entry identifies the track and location within the track of each record as well as metadata associated with the record size, creation date, time, originator, change history and the like. Registration marks may be added in the tracks and referred to by the table of contents to help find and align the records. In the preferred embodiment the table of contents is located at the logical beginning of the optical tape and contains both visual entries and digital entries.

Other features may be included on the medium and housing to assist in the writing and retrieval of documents as well as monitoring and control of the medium itself. Features such as tracking, positioning, alignment and calibration marks assist in the physical manipulation of the medium when inserting into, and when in use by the readers and writers. Identification of the medium manufacturer, date codes, media type and the like are useful in areas such as identification, quality control and inventory. These types of features can either be incorporated by the manufacturer using a laser-based system, embossing process, molding process, or similar processes, or written into the writeable layer by the user. Alternatively, this type of information can be stored in externally readable non-volatile solid state memory carried in the housing.

A laser scanner is used to write the electronic file information and its associated metadata, and global metadata such as the table of contents, on the optical recording medium. The output of the laser scanner is a single laser beam or an array of laser beams. In the preferred embodiment the laser beams have a spot size of just under one micrometer at the optical recording medium to match a 300 dpi electronic file de-magnified by a factor of 85×. The small spot size is achieved with a lens having a numerical aperture of about 0.24. To write information the laser scanner controls the intensity of the laser beams as well as the relative position between the laser beams and the optical recording medium. With disk media the medium is normally spun around its center while a carriage carries the laser beams and optics in the radial direction. With tape media the medium is normally moved in the direction of its length, the laser optics deflect the laser beams across the width of one track, and a carriage moves the laser beams and optics from track to track. Many other arrangements are possible.

Figure 4:
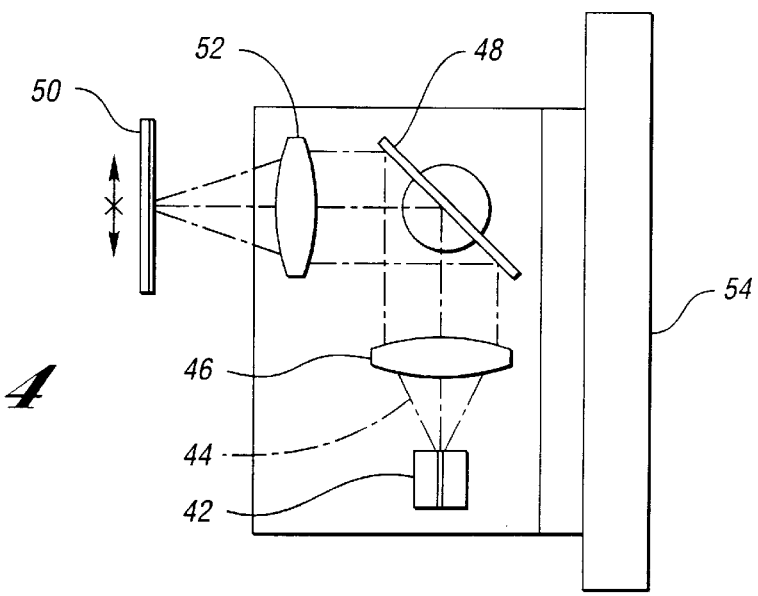
FIG. 4 is a schematic diagram of a galvanometer based laser position and intensity control portion of a scanning laser writer.

FIG. 4 shows a galvanometer-based laser position and intensity control portion of a laser scanner which is the preferred embodiment of the scanner. An array of four lasers 42 generates the laser beams 44 which pass through a collimating lens 46, are swept across the width of a track by a scanning galvanometer mirror 48 and focused onto the optical recording medium 50 by a second lens 52. The mirror 48 sweeps the laser beams in a saw-tooth fashion with a 75/25% duty cycle. The laser beams 44 write data on the medium 50 during the main sweep, and on the return sweep the laser beams 44 are extinguished. For this type of scanning, the medium may be advanced continuously, or by stepping during the return sweep. The continuous case results in a slight elongation of the visual image due to a gap between the scan lines, proportional to the scan return or fly-back time. In the array case, if there is a separation between the focused spots on the medium, interleaving may be used to fill in the spaces. When the scanner is writing digital information, the medium 50 is advanced to maintain a one row separation to minimize cross-talk. Using mirror frequencies between 825 Hz to 3300 Hz the scanner writes one visual record of an 8.5 by 11 inch document in 1 to 4 seconds, using 1 to 16 lasers in the array. The scanner includes a linear stepper carriage 54 to move the lasers, mirrors and lenses from track to track.

In a variation on the preferred embodiment the scanner uses a two-way harmonic scan where the laser beams write during the main sweep and during the return sweep. This approach decreases the frequency response needed from the mirror but it requires the medium to be advanced in steps while the mirror is changing directions. In this case, using mirror frequencies between 206 Hz and 825 Hz, the scanner writes one document in 1 to 4 seconds, using 1 to 16 lasers in the array. In another embodiment the scanner uses a multi-faceted polygonal rotating mirror. In this embodiment the medium is moved continuously which simplifies its control.

Figure 5:
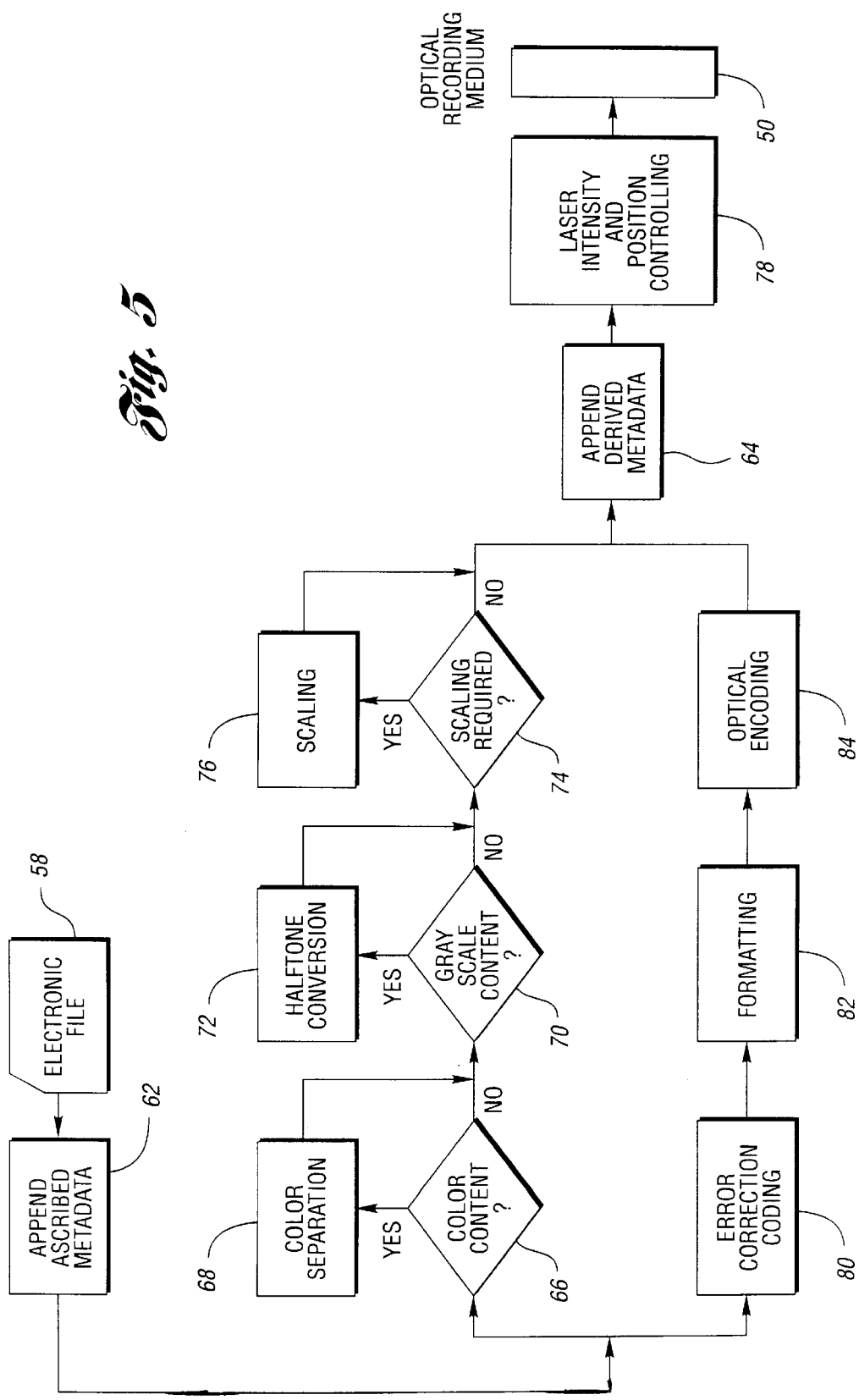
FIG. 5 is a flow chart which shows the processing of information by the laser scanner from the electronic file to the optical recording medium.

FIG. 5 shows the processing of information performed by the laser scanner. First, the electronic file 58 is sent to the laser scanner. Next, metadata which is embedded in or attached to the electronic file is extracted and ascribed to the document and appended 62 to the data. For the visual records, visual headers and visual table of contents entries, the information is checked for color content 66. If color is present then the color is separated 68 into multiple visual records with one visual record for each color component. The information is then checked for gray-scale content 70. If present, the gray-scale information is converted to half-tones 72. A decision 74 is made whether or not to scale 76 the width, length and resolution of the document. Then, metadata which is derived from the foregoing processing and also is descriptive of record placement on the media and other characteristics is appended 64 to the data. Finally, the information is written into the optical recording medium 50 by controlling the laser beam intensity and relative position 78.

For digital records, digital headers and digital table of contents entries, after the ascribed metadata is appended 62, the information undergoes error correction coding 80. A formatting process 82 then arranges the information into fixed length traverse or longitudinal scan rows and decides which laser of the array will write the data. An optical encoding process 84 converts the digital ones and zeros to appropriate laser intensities using pulse width modulation, pulse position modulation, or other suitable modulation scheme. Then, metadata which is derived from the foregoing processing and also is descriptive of record placement on the media and other characteristics is appended 64 to the data. Finally, the laser intensity and position control process 78 writes the information into the optical recording medium 50.

Several types of readers can be used to extract the information from the optical recording media such as a white light optical microscope, scanning electron microscope, or an acoustic microscope. Where the media is of hole burning or crystallographic phase change type, the preferred embodiment to read the visual records, visual headers and visual table of contents entries is a monitor connected to a television camera with an objective lens having a numerical aperture in the range of 0.4 to 0.6. The digital image file can then be re-created by re-digitizing the visual information, for example by using a video frame grabber. For magnetooptical medium polarizing plates are inserted into the optical path to make the information visible. For pit-forming medium phase-contrast plates are used. Where color documents have been separated into multiple visual images a multibeam microscope is used. Each beam of this microscope has a color filter which tints the individual color component images the appropriate color. Additional optics merge all of the beams back into one full color image. Where 3-dimensional scenes have been stored as multiple images within a document a stereoscopic microscope is used to view the 3-dimensional scene. The two images can be recorded digitally on the optical medium as separate files, which can be read and processed by a computer to generate a 3-dimensional display on an appropriate monitor.

The preferred embodiment of an optical reader for retrieving the digital records, digital headers and digital table of contents entries is a one-dimensional photo detector array which senses the full width of the record as the medium moves past. In an alternative embodiment the digital information is read using a galvanometer or rotating mirror laser scanner.

Although multiple embodiments of the invention have been shown and described it will be understood by those skilled in the art that many possible variations can be made without departing from the scope of this invention. This invention is not limited by the specific embodiments, rather it is defined in the following claims.

What is claimed is:

1. A system for storing documents having a width and a length, and which exist as information in electronic files at a selected resolution, the system comprising:
   an optical recording medium having a laser writeable layer; and
   a scanner emitting at least one variable intensity laser beam that engages said writeable layer, said scanner receives said information in electronic files, and controls said intensity of said at least one laser beam and relative position of said at least one laser beam on said writeable layer in response to said electronic files to directly write a visual record into said writeable layer at a de-magnification factor for each of said documents, said at least one laser beam altering reflectivity of said writeable layer when said visual record is written.

2. The system of claim 1 wherein a table of contents area is defined in said writeable layer, and for each of said documents said scanner writes a visual table of contents entry in said table of contents area and a visual header adjacent to said visual record.

3. The system of claim 1 wherein said scanner detects and converts gray-scale information within said electronic files into halftone information.

4. The system of claim 1 wherein said scanner detects and separates color information within said electronic files into a plurality of color components, and wherein said scanner writes one said visual record for each of said plurality of color components.

5. The system of claim 1 wherein said scanner scales said width and said length of said document within said electronic files.

6. The system of claim 1 wherein said scanner scales said selected resolution of said document within said electronic files.

7. The system of claim 2 further comprising a microscope for viewing said visual records, said visual headers, and said visual table of contents entries.

8. The system of claim 1 further comprising a stereoscopic microscope for viewing said visual records containing multiple image 3-dimensional scenes.

9. The system of claim 4 further comprising a multi-beam microscope for color viewing, said multi-beam microscope comprising:
    a plurality of beams, one for each of said plurality of visual records;
    a plurality of color filters, one for each of said plurality of beams, for tinting each of said plurality of beams an appropriate color; and
    optics for merging said plurality of beams into a single color image.

10. The system of claim 1 wherein a plurality of tracks, each approximately 2.5 millimeters wide, are defined in said writeable layer and said de-magnification factor is approximately 85 so that said visual records of said documents having said width of 8.5 inches fit into one track of said plurality of tracks.

11. The system of claim 10 wherein for each of said documents having said width of greater than 8.5 inches said scanner writes said visual record across at least two adjacent tracks of said plurality of tracks.

12. The system of claim 1 wherein for each of said documents said scanner further writes a digital record.

13. The system of claim 2 wherein for each of said documents said scanner further writes a digital record, a digital table of contents entry in said table of contents area and a digital header adjacent said digital record.

14. The system of claim 13 wherein said scanner incorporates error correction coding into said digital record, said digital table of contents entry, and said digital header.

15. The system of claim 13 wherein a plurality of tracks, each having a transverse direction and a longitudinal direction, are defined in said writeable layer, and wherein said scanner formats said digital record, said digital header, and said digital table of contents entry as rows of data written in said transverse direction.

16. The system of claim 13 wherein a plurality of tracks, each having a transverse direction and a longitudinal direction, are defined in said writeable layer, and wherein said scanner formats said digital record, said digital header, and said digital table of contents entry as rows of data written in said longitudinal direction.

17. The system of claim 13 further comprising an optical reader for transforming said digital records, said digital headers, and said digital table of contents entries into an electronic format.

18. The system of claim 1 wherein said medium has a form selected from the group of forms consisting of tape and disk.

19. The system of claim 18 further comprising a housing suitable for human and machine handling, and wherein said medium is disposed within said housing.

20. The system of claim 1 wherein said writeable layer is selected from the group of writeable layers consisting of metallic films, dye-polymer films, bubble forming films, magneto-optical films, and amorphous to crystalline phase transition films.

21. The system of claim 20 wherein said optical recording medium further comprises a substrate supporting said writeable layer, said substrate is selected from the group of substrates consisting of polyester, kapton, aramid, metals, polycarbonate, and polyester.

22. A method of storing a document having a width and a length, and which exist s as information in an electronic file at a selected resolution, the method comprising:
    placing an optical recording medium in communication with a scanner, said optical recording medium having a laser writeable layer, said scanner having at least one variable intensity laser beam which engages said writeable layer;
    reading said information in electronic file into said scanner; and
    writing a visual record in said writeable layer at a de-magnification factor by controlling said intensity of said at least one laser beam and relative position of said at least one laser beam on said writeable layer in response to said electronic file, said at least one laser beam directly altering reflectivity of said writeable layer when said visual record is written.

23. The method of claim 22, wherein a table of contents area is defined in said writeable layer, the method further comprising:
    moving said relative position of said at least one laser beam on said writeable layer such that said at least one laser beam is directed adjacent said visual record;
    writing said visual header in said writeable layer;
    moving said relative position of said at least one laser beam on said writeable layer such that said at least one laser beam is directed at said table of contents area; and
    writing said visual table of contents entry in said writeable layer.

24. The method of claim 22 further comprising:
    detecting gray-scale information within said electronic file; and
    converting gray-scale information within said electronic file into halftone information.

25. The method of claim 22 further comprising:
    detecting color information within said electronic file;
    separating said color information within said electronic file into a plurality of color components; and
    writing a plurality of visual records in said writeable layer, one for each of said plurality of color components.

26. The method of claim 22 further comprising scaling said width and said length of said document within said electronic file.

27. The method of claim 22 further comprising scaling said selected resolution of said document within said electronic file.

28. The method of claim 23 further comprising magnifying said visual record, said visual header, and said visual table of contents entry for viewing.

29. The method of claim 22 further comprising independently magnifying each image of a multiple image 3-dimensional scene contained within said visual record for stereoscopic viewing.

30. The method of claim 25 further comprising:
    magnifying each of said plurality of visual records;
    tinting each of said plurality of visual records an appropriate color; and
    merging said plurality of visual records into a single color image for viewing.

31. The method of claim 22 wherein a plurality of tracks, each approximately 2.5 millimeters wide, are defined in said writeable layer and said de-magnification factor is approximately 85 so that said visual record of said document having said width of 8.5 inches fits into one track of said plurality of tracks.

32. The method of claim 31 wherein for said document having said width of greater than 8.5 inches said method further comprises writing said visual record into said writeable layer across at least two adjacent tracks of said plurality of tracks.

33. The method of claim 22 further comprising:
    moving the relative position of said at least one laser beam on said writeable layer such that said at least one laser beam is directed away from said visual record; and
    writing a digital record in said writeable layer.

34. The method of claim 23 further comprising:
    moving the relative position of said at least one laser beam on said writeable layer such that said at least one laser beam is directed away from said visual record;
    writing a digital record in said writeable layer;
    moving the relative position of said at least one laser beam on said writeable layer such that said at least one laser beam is directed adjacent said digital record;
    writing a digital header in said writeable layer;
    moving the relative position of said at least one laser beam on said writeable layer such that said at least one laser beam is directed at said table of contents area; and
    writing a digital table of contents entry in said writeable layer.

35. The method of claim 34 wherein prior to writing said digital record in said writeable layer, the method further comprises incorporating error correction coding into said digital record, said digital table of contents entry and said digital header.

36. The method of claim 35 wherein a plurality of tracks, each having a transverse direction and a longitudinal direction, are defined in said writeable layer, the method further comprises formatting said digital record, said digital header and said table of contents entry as rows of data written in said transverse direction.

37. The method of claim 35 wherein a plurality of tracks, each having a transverse direction and a longitudinal direction, are defined in said writeable layer, the method further comprises formatting said digital record, said digital header and said table of contents entry as rows of data written in said longitudinal direction.

38. The method of claim 23 further comprising:
    reading said digital record, said digital header and said digital table of contents entry from said writeable layer; and
    transforming said digital record, said digital header and said digital table of content entry into an electronic format.

* * * * *